Patented Nov. 14, 1944

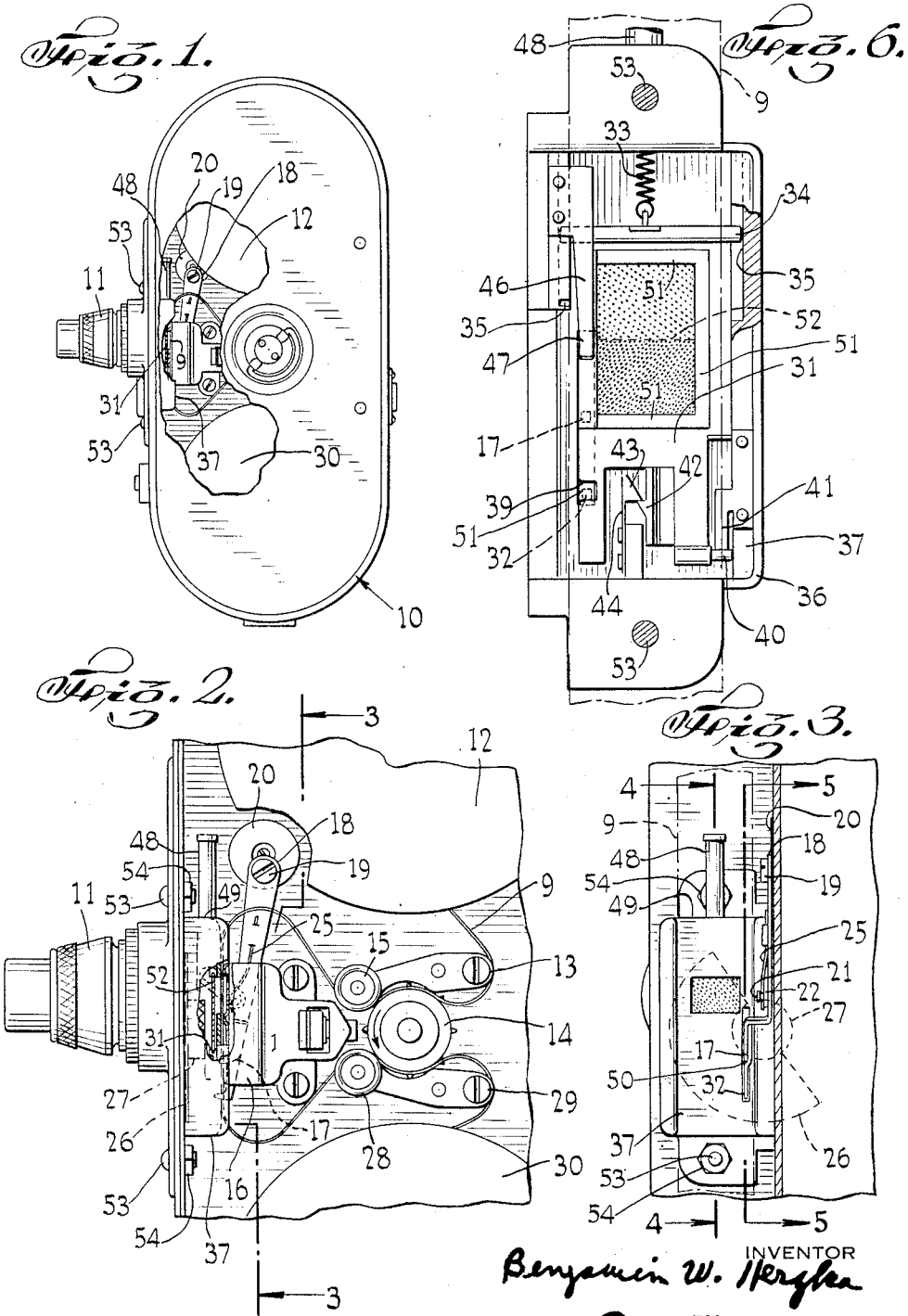

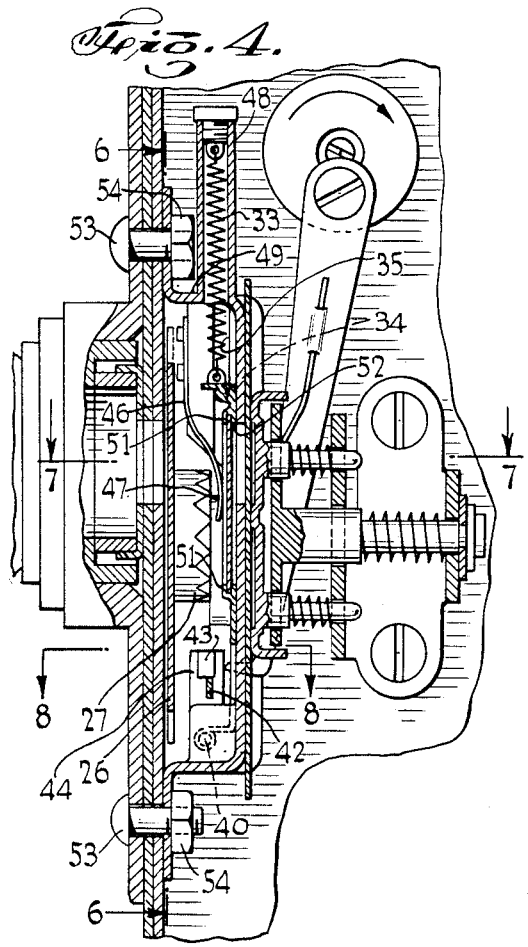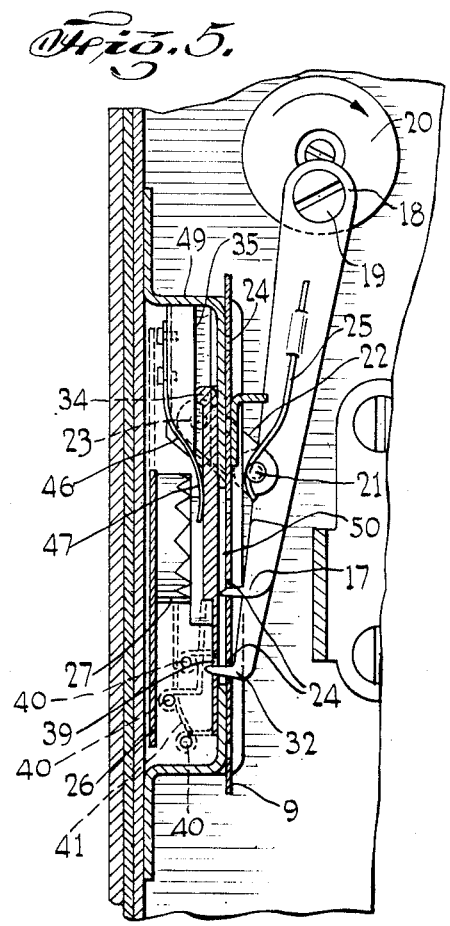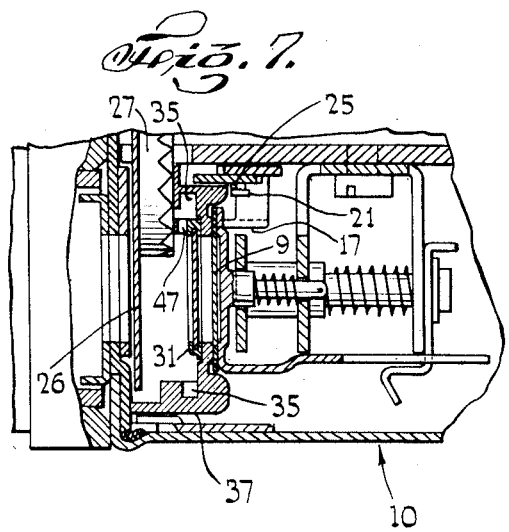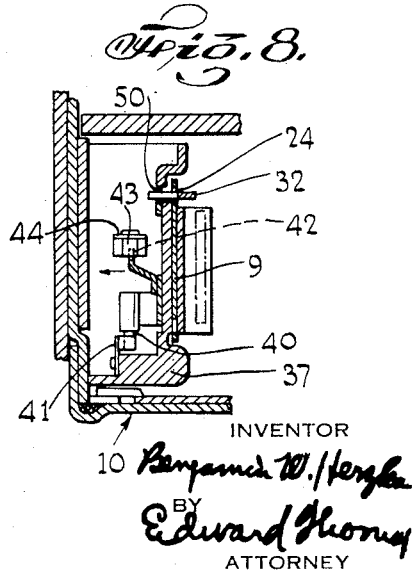

2,362,818

UNITED STATES PATENT OFFICE 2,362,818

COLOR FILTER FOR MOVING PICTURE DEVICES

Benjamin W. Herzka, New York, N. Y.

Application July 15, 1943, Serial No. 494,790

9 Claims. (Cl. 88—16.4)

This invention relates to color filters for moving picture devices and is herein illustrated as embodied in a moving-picture camera adapted to take black and white images on a negative film, exposing alternately through red and blue or green filters the successive film frames to produce those images.

Rotating filters have been used in the past to alternately bring red and green filter screens between film and object, either in front of or behind the lens to photograph the object alternately through the color filters, but such filters are open to several objections. First, they move during the exposure and thus, even if nearly optically perfect, give an unconscious suggestion of motion by shifting of the light rays. Second, they cause vibrations unless very carefully balanced. Third, they require continuous power drive. Fourth, they cannot be incorporated in many standard cameras or projectors without substantial rebuilding of the device. Other objections sometimes arise.

According to the present invention the foregoing and other disadvantages and objections are overcome and a device is provided which fits many cameras, even hand moving-picture cameras, holds the filter still while each frame of the picture is being exposed, may be a separate unit, and is economical to build and to install, and capable of being put in many standard cameras by an ordinary camera repairman, though other forms may be equally useful in other connections.

In the form disclosed in some detail a plate insertible between the lens and the film support carries a slide on which are mounted colored film or films constituting the filters. The slide is adapted to feed from its initial position with the film as the claw advances the film along one frame and to drop back to initial position while the claw advances the next frame. Thus the colored areas of the filter are alternately between successive frames of the advancing film, and may cause successive pictures to be taken through alternating filter colors.

The plate which is thus insertible may have turned up edges to form a shallow box in which the slide travels first with the usual claw, then is caught by a hook, and then is released by the next push of the claw and pulled by a spring which may be housed upon but outside the box. Thus a simple structure enables a two-color filter to be mounted in almost any hand moving picture camera to enable a black and white negative to record the exposure, a print made from that negative projected through suitable filters to reproduce in the original colors a moving picture upon a screen.

Other features and advantages will hereinafter appear.

In the accompanying drawings,

Fig. 1 is a side view of a hand moving picture camera with parts broken away to show part of the present invention;

Fig. 2 is an enlarged view of the same parts;

Fig. 3 is a sectional view on the line 3—3 of Fig. 2;

Fig. 4 is a view of the parts seen in Fig. 2, with more broken away, on the line 4—4 of Fig. 3, and on a larger scale;

Fig. 5 is a sectional view of the same on the line 5—5 of Fig. 3;

Fig. 6 is a front view of the filters and their operating parts when out of the camera on the line 6—6 of Fig. 4;

Fig. 7 is a sectional view on the line 7—7 of Fig. 4; and

Fig. 8 is a sectional view on the line 8—8 of Fig. 4.

The usual Keystone Model A-3 hand moving picture camera includes a casing 10, a screwed-in lens 11, an internal film feed reel 12 feeding the film 9 past the usual guide 13 to the usual sprocket wheel 14, and thence past the usual guide 15, in a loop to the film support 16. The film is fed intermittently past the support 16 by the usual claw 17 which takes the form of a floating lever pivoted at its base 18 on the pin 19 eccentrically mounted on the rotating disc 20, and also pivoted intermediate its ends at 21 to a short link 22 which in turn is pivoted on a fixed pivot 23, so that as the disc 20 revolves it pushes the claw 17 in to catch in a perforation 24 in the film 9 and pushes the film along the distance of one "frame" of the film 9 and then withdraws the claw 17 and pulls it back by the further rotation of the disc 20 ready for another forward push of the film 9. The spring 25 holds the claw in position by bearing against the pivot 21.

The disc 20 is so driven by the usual driving mechanism (not shown, but including the gear 27), that it pushes the film 9 only when the revolving sector shutter 26 is closed, and leaves the film 9 at rest when the shutter 26 is open.

After the film passes the gate or support 16 it feeds in a loop to the guide post 28, the sprocket wheel 14 and a second guide post 29 and is wound upon the winding reel 30.

To enable the exposures on the film to be alternately taken behind a red and green or other alternating filter, a filter mount or slide plate 31 is shown as adapted to be alternately operated by a secondary claw 32, formed as an extension of the claw 17, and by a return spring 33.

In the form shown the filter mount 31 is carried by a hinge or pintle 34 having ends sliding in undercut slots 35 on the sides 36 of the shallow box 37 in which the filter mount operates. The return spring 33 is shown as attached to the pintle 34 so that it normally tends to draw the slide upward where it holds the green half 38 of the filter between the lens 11 and the film 9.

When the claw 17 engages the film 9 and pushes it along, the secondary claw 32 at the same time engages a notch 39 in the filter slide plate 31, and pushes the plate 31 at the same time and to the same distance.

In thus moving the filter slide plate 31 it carries a projecting side pin 40 along under an overlying leaf spring 41 so that the spring presses down on the pin 40 and holds the slide against the inner face of the box 37 in which the slide 31 slides, carrying the pin 40 beyond the downwardly inclined end of the leaf spring 41. At the same time, a catch 42 projecting sideways above the slide 31 has been engaging and camming out of the way a spring-pressed fixed catch 43, so that as the pin 40 passes the end of the leaf spring 41, the catch 42 has hooked over the end of the catch 43 which has been swung back by its spring 44.

In this position the slide 31 is held by the catch 43. The secondary claw 32 now withdraws because it is about to be drawn back with the claw 17 by the rotation of the disc 20, as the shutter 26 opens at the lens 11.

The shutter is open while the filter slide 31 is at rest. When the shutter closes, the claw 17 enters the next notch 24 in the film 9, carrying the secondary claw 32 against the flat surface of the slide 31, and slightly turns the slide 31 on its pintle 34.

This turn releases the slide hook 42 from the spring hook 43, and thus the coil spring 33 pulls the slide 31 back to initial position, the pin 40 riding, by way of precaution above the flat spring 41 and thus carrying the slide 31 and its hook 42 outward so that slide 31 returns freely, holding its notch 39 out of reach of the secondary claw 32.

By way of precaution the slide 31 is held against swinging outwardly on its pintle 34 by a flat spring 46 fastened to the wall 36 and lying with its free end 47 on the edge of the slide 31, and holding the notch 39 normally ready to be engaged by the secondary claw 32.

In the form shown the casing 37 is the front plate forming part of the usual gate through which the film 9 is drawn as above described. The usual screws for holding the casing are here shown as bolts 53 with nuts 54. The spring 33 is shown as a rapidly acting fine coil spring mounted in an upper cylindrical casing 48 fast to the end 49 of the casing 37, and the claws 17 and 32 project through a slot 50 (Fig. 3) in the casing.

The two-color screen or filter is shown as held between very small ears 51 surrounding the opening 52 in the film slide 31.

It is found that the black and white photographic images taken through a suitable red and blue alternating set of filters, may be printed and the slightly yellowed print projected through alternating red and green filters to yield a projection in apparently natural colors. If the camera filters are alternately red and green the print for projection is preferably slightly blued to give the proper effect when projected through red and green alternating colors.

Having thus described one embodiment of the invention in some detail, what is claimed is:

1. The combination with a lens and shutter of a film support, a filter-bearing frame between the support and lens, two transparent differently colored areas in the filter, a claw for feeding a film intermittently across said support, means connected to said claw for moving the frame with the film at alternate movements of the claw, and a spring for returning said frame to its initial position between alternate movements of the claw.

2. The combination with a lens and shutter of a film support, a filter-bearing frame between the support and lens, two transparent differently colored areas in the filter, a claw for feeding a film intermittently across said support, a secondary claw connected to said first claw for moving the frame with the film at alternate movements of the claw, a spring for returning said frame to its initial position between alternate movements of the claw, and means for guiding the frame away from the claw while it returns.

3. The combination with a casing adapted to fit between a lens and a film support, of a filter-bearing frame slidable within the casing and including a notch to receive a reciprocating claw to carrying the frame intermittently with a film sliding across said support, guides holding one end of the frame against the casing, an arm projecting from the other end of the frame, a flat spring under which the arm moves as the frame slides with the claw, a bent end of said flat spring adapted to spring under the arm and cam the arm up on the return stroke of the frame, means for moving the frame on its return stroke, and means normally holding the frame against the casing.

4. The combination with a casing adapted to fit between a lens and a film support, of a filter-bearing frame slidable within the casing and including a notch to receive a reciprocating claw to carry the frame intermittently with a film sliding across said support, guides holding one end of the frame against the casing, an arm projecting from the other end of the frame, a flat spring under which the arm moves as the frame slides with the claw, a bent end of said flat spring adapted to spring under the arm and cam the arm up on the return stroke of the frame, a catch for delaying the return stroke, means for moving the frame on its return stroke, and means normally holding the frame against the casing.

5. The combination with a casing adapted to fit between the lens and a film support, of a filter-bearing frame, slidable within the casing and including a notch to receive a reciprocating claw to engage and carry the frame intermittently with a film sliding across said support, guides holding one end of the frame against the casing, an arm projecting from the other end of the frame, a flat spring under which the arm moves as the frame slides with the claw, a bent end of said flat spring adapted to spring under the arm and cam the arm up clear of the claw on the return stroke of the frame, means for moving the frame on its return stroke, and means normally holding the frame against the casing.

6. The combination with a camera having a casing adapted to fit between the camera lens and the camera film support, of a filter-bearing frame slidable within the casing and including a notch to receive a reciprocating claw to carry the frame intermittently with a film sliding across said support, guides holding one end of the frame against the casing, an arm projecting from the other end of the frame, a flat spring under which the arm moves as the frame slides with the claw, a bent end of said flat spring adapted to spring under the arm and cam the arm up on the return stroke of the frame, means for moving the frame on its return stroke, and means normally holding the frame against the casing.

7. The combination with a camera having a lens, a casing on which the lens is mounted, a film drive within the casing, a first claw moving by said drive to feed a film past the lens, a shutter at the lens, a two color filter frame between the shutter and the film, a second claw attached to the first claw for moving the frame with the film, and a spring for returning the frame to initial position.

8. The combination with a camera having a lens, a casing on which the lens is mounted, a film drive within the casing, a first claw moved by said drive to feed a film past the lens, a shutter at the lens, a two color filter frame between the shutter and the film, a second claw attached to the first claw for moving the frame with the film, means for holding the frame clear of the claw, and a spring for returning the frame to initial position.

9. The combination with a camera having a lens, a casing on which the lens is mounted, a film drive within the casing, a first claw moved by said drive to feed a film past the lens, a shutter at the lens, a two color filter frame between the shutter and the film, a second claw attached to the first claw adapted to engage a notch in the frame for moving the frame with the film, means for holding the frame clear of the claw, and a spring for returning the frame to initial position.

BENJAMIN W. HERZKA.